United States Patent

Fritz et al.

[11] 3,894,398
[45] July 15, 1975

[54] RICE BOX

[75] Inventors: Clarence M. Fritz, Marysville; Stephen E. Carnes, Yuba City, both of Calif.

[73] Assignee: Consolidated Fiberglass Co., Marysville, Calif.

[22] Filed: Feb. 27, 1974

[21] Appl. No.: 446,255

[52] U.S. Cl. .................................... 61/28; 61/29
[51] Int. Cl.² .......................................... E02B 7/28
[58] Field of Search ............... 61/29, 28, 18, 17, 12

[56] References Cited
UNITED STATES PATENTS

| | | | |
|---|---|---|---|
| 1,772,518 | 8/1930 | Pardini | 61/29 |
| 2,080,045 | 5/1937 | Hornsby | 61/18 |
| 2,928,251 | 3/1960 | Waring | 61/29 |
| 3,287,918 | 11/1966 | Stewart | 61/29 X |
| 3,323,311 | 6/1967 | Johnson | 61/28 |
| 3,760,593 | 9/1973 | Whipps | 61/28 |

Primary Examiner—Jacob Shapiro
Attorney, Agent, or Firm—Townsend and Townsend

[57] ABSTRACT

A gate for regulating the water flow between adjacent fields, such as rice fields separated by a levee, for submerging the fields in water. The gate has a generally U-shaped configuration and is constructed of a relatively thin fiberglass material. It has a horizontal floor member, contiguous upright sidewalls and a generally U-shaped, continuous flange on each end of the gate which is contiguous with and extends perpendicular with respect to the floor plate and the sidewalls. The gate is placed in a complementary cutout in the levee and the flanges have a sufficient width so that frictional forces generated between the flanges and the surrounding earth of the levee prevent buoyancy forces from floating the gate upwardly. The gate includes a snap-in stiffener at its top end to prevent the levee from deflecting the upright sidewalls inwardly. Means is provided for positioning a dam plate in the water passage through the gate and for withdrawing the dam plate in a vertical direction.

4 Claims, 8 Drawing Figures

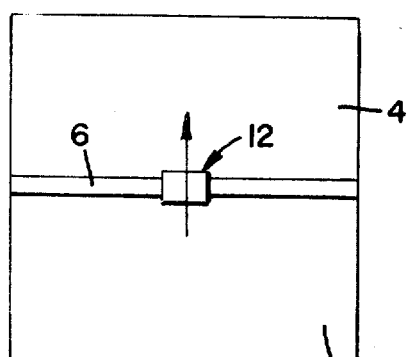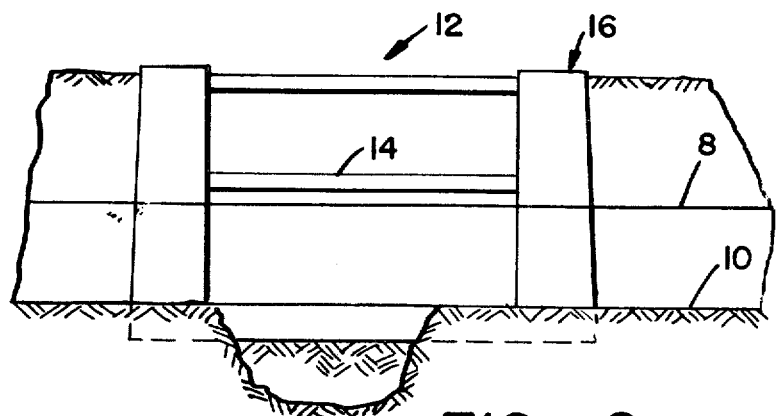
FIG_1  FIG_2
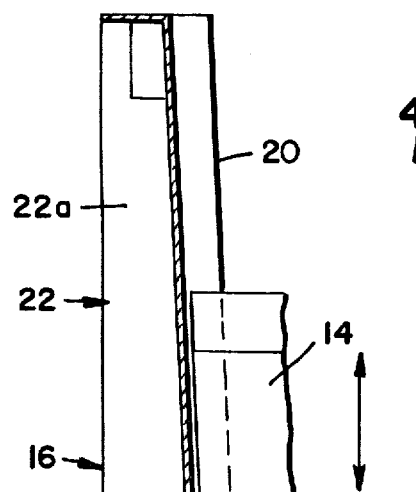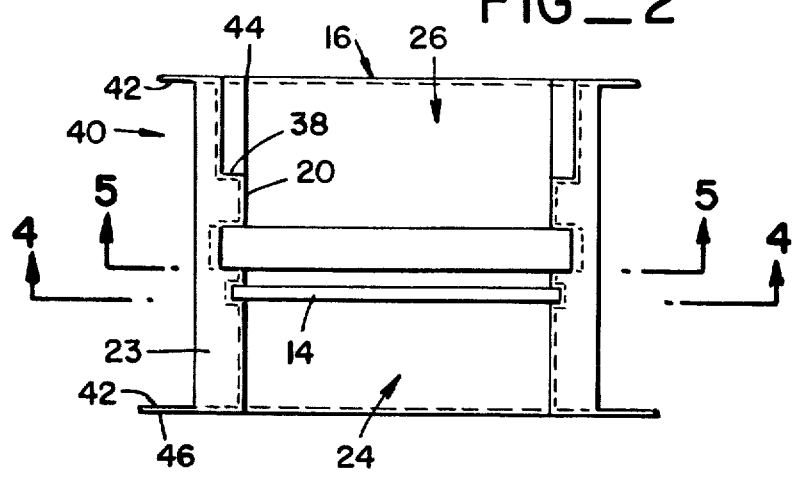
FIG_4  FIG_3
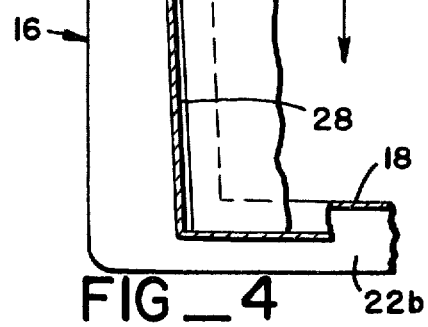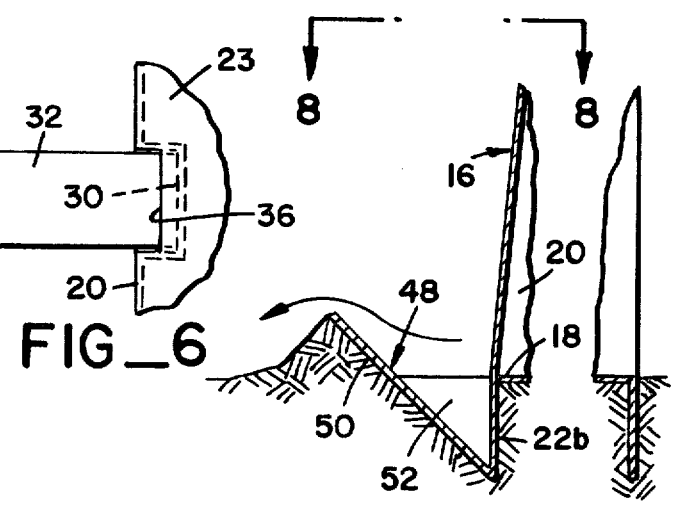
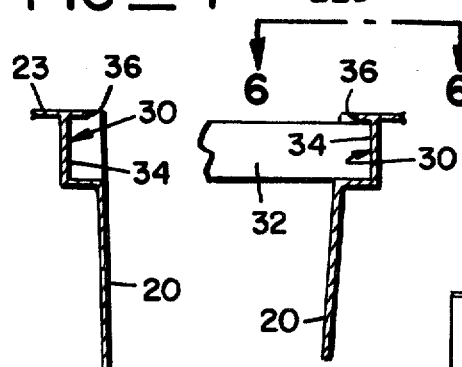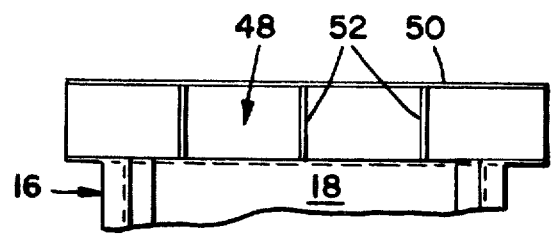
FIG_5  FIG_6  FIG_7  FIG_8

RICE BOX

BACKGROUND OF THE INVENTION

The cultivation of rice from time to time requires that the fields be flooded. It is advantageous to flood the fields with the same body of water to take advantage of the relatively high water temperature from the continued exposure of the water to the sun. To accomplish this rice fields are arranged in adjoining sections which are separated by water blocking levees.

During the course of a growing season water is circulated from one section to the next adjoining one. For this purpose gates, often referred to as "rice boxes" are provided in the levee. Normally, the boxes are closed. When the water is to be circulated from one section to the next they are opened.

In the past the rice boxes usually comprised wooden frames placed in corresponding cutouts in the levees. The use of steel rice boxes is also known. Such boxes comprise a generally U-shaped frame and a dam plate disposed in the passageway through the frame which can be withdrawn for circulating water from one field section to the next. The wooden boxes have a number of drawbacks. First, they are relatively expensive to construct. Their continued exposure to water results in a short life-time and renders them vulnerable to damage from rodents such as rats. Moreover, buoyancy forces generated by the water in the fields have a tendency to raise the rice boxes off their foundations. To counteract the buoyancy forces special anchoring posts are driven into the levee and/or the surrounding ground. Prior art steel rice boxes have similar shortcomings. They are subject to extensive corrosion and they, too, can experience buoyancy forces so that they, too, required anchoring posts that must be driven into the adjoining levee.

In addition, prior art rice boxes provide a protection for the levee and the fields against water erosion. When the rice box is opened relatively strong water currents are present on each side of the box. Frequently the currents are of sufficient magnitude to erode away the levee in the vicinity of the boxes. Moreover, water rushes through the boxes at substantial speeds and spills onto the downstream field with such force that plants within a radius of up to ten feet and more from the box are damaged and often destroyed. Thus, although the construction of water flow regulating boxes appears relatively simple, presently available rice boxes have deficiencies which impair the efficiency with which rice can be grown.

SUMMARY OF THE INVENTION

The present invention provides a flood control gate or rice box for use in circulating water between adjoining rice fields and the like which overcomes the heretofore experienced shortcomings. The box of the present invention is constructed of a lightweight, corrosion-resistant plastic material such as fiberglass, is self-anchoring in the ground to prevent water from buoying it up, and protects the levee adjacent the box and the downstream field from damaging water erosion.

In its general form the present invention provides a flow regulating gate which has a generally U-shaped confirguation defined by a horizontal floor plate and upwardly extending sidewalls. Flanges depend perpendicularly away from ends of the floor plate and the sidewalls, also have a generally U-shaped configuration and are integrally constructed with the floor plate and the sidewalls. The floor plate, sidewalls and the flanges define a space between them into which earth or ground from the levee is compacted. The flanges have a width so that frictional forces generated between them and the ground is of a sufficient magnitude to prevent buoyancy forces from floating the gate upwardly. Additionally, the outer faces of the flanges on the upstream side of the gate protect the levee adjacent the gate from erosion caused by strong water currents in the vicinity of the gate. The sidewalls include a vertically oriented, upwardly opening groove for positioning a gate member or dam plate in the passageway through the gate to prevent water from flowing so long as the plate is in place and to permit water circulation from one field to the next when the plate is removed from the groove.

To prevent the ground surrounding the gate from crushing or deflecting the sidewalls inwardly, which might impair the functioning of the gate, a stiffening or compression bar is demountably secured to opposing points of the sidewalls. When the gates are not in use and stored the stiffeners and the dam plates can be removed so that the gates can be stacked one on top of the other. Storage space for the gates is thereby minimized.

The downstream side of the gate includes a water deflector which interrupts and slows down the flow of water through the gate onto the downstream field to avoid field and crop damage. This deflector is preferably defined by an upwardly inclined plate extending away from the downstream end of the gate, originating at a point below the floor plate and terminating in a free edge disposed above the floor plate. The exact height of the plate will vary with encountered water depth. For rice plantations a height of approximately four inches above the floor plate, and therefore above ground, is preferred.

Since the gate must have a length, in the direction of the water flow, equal to the thickness of the levee, and since the gate is constructed of a thin-walled, relatively flexible material, it is further preferred to incorporate in the sidewalls means, such as ribs, perpendicular sides and the like which discourage gate deflection and thus prevent possible jamming of the gate member or the stiffening bar. Such ribs further prevent accidental cracking or damage to the gate.

As a result of the above-discussed construction of the gate of the present invention heretofore experienced shortcomings such as water buoyancy of the gate, deterioration of the gate from rotting and corrosion or rat damage are eliminated. Furthermore, the gates of the present invention are lightweight and can be compactly stored. They are of a unitary construction and readily removed from the levee when no longer required. Instead of discarding such gates, due to their advanced deterioration as was common in the prior art, the gate of the present invention can be stored for reuse when and where required. Substantial cost savings are thus provided.

BRIEF DESCRIPTION OF THE DRAWINGS

FIG. 1 is a schematic plan view of two adjoining rice field sections separated by a levee provided with a water flow regulating gate or rice box constructed in accordance with the present invention;

FIG. 2 is a side elevational view, with parts of the ground broken away, of the box illustrated in FIG. 1;

FIG. 3 is a plan view of the box shown in FIG. 2;

FIG. 4 is a fragmentary, enlarged, cross-sectional view and is taken on line 4—4 of FIG. 3;

FIG. 5 is a fragmentary, side-elevational view, in section, and is taken on line 5—5 of FIG. 3, and illustrates a gate compression bar constructed and secured in accordance with the present invention;

FIG. 6 is a fragmentary, enlarged plan view and is taken on line 6—6 of FIG. 5;

FIG. 7 is a fragmentary, side-elevational view of the box and illustrates in detail a downstream water flow deflector constructed in accordance with the present invention; and FIG. 8 is a fragmentary plan view, of a reduced scale, taken on line 8—8 of FIG. 7 and illustrates the downstream portion only of that box.

DESCRIPTION OF THE PREFERRED EMBODIMENTS

Referring to FIGS. 1–6, two adjoining fields, say rice field sections 2 and 4 are separated by a levee 6. Upstream field 2 includes a body of water 8 which submerges ground 10 upon which plants, e.g. rice, grows. A water flow regulating rice box 12 is disposed in the levee and includes a gate member or a dam plate 14 which, when in its closed position (shown in FIG. 2) prevents water circulation from upstream field 2 to downstream field 4. When the dam plate is raised water can be transferred from the upstream field to the downstream field.

Rice box 12 is defined by a generally U-shaped insert 16 that is anchored in levee 6 as described hereinafter. The insert has a generally horizontal floor plate 18 and a pair of opposing, upwardly extending sidewalls 20 which are integrally constructed with the floor plate. The insert also includes a generally U-shaped flange 22 on the upstream and downstream ends 24, 26, respectively, of the box. The flange is defined by a pair of upwardly extending side flanges 22a and a horizontal bottom flange 22b which extend perpendicularly away fom the sidewalls and the floor plate, respectively. The U-shaped flanges are also integrally constructed with the floor plate and the sidewalls and the flange sections are contiguous. Lastly, insert 16 includes a horizontal top flange that extends parallel to the top surface of the levee from the upper edge of the sidewalls. It, too, is integrally constructed with the sidewalls and with the upper ends of side flanges 22a.

In the preferred embodiment of the invention the insert is constructed of a cured, wet lay-up plastic material such as fiberglass. For a rice box having a maximum length (in the water flow direction) of approximately 3 feet, a maximum width of about 8 feet and a height of about 2 feet a fiberglass thickness of about ⅛ inch to ¼ inch, and preferably no more than 3/16 inch is sufficient. Furthermore, for purposes more fully discussed hereinafter the side flanges 22a have a width, adjacent their lower ends, of at least about 5 to 7 inches and the bottom flanges 22b have a width of at least about 4 inches.

Insert 16 also includes a vertically oriented groove 28 which extends from the upper edge of the sidewalls to and preferably into floor plate 18 and is best seen in FIG. 4. The groove has a sufficient width to slideably accommodate dam plate 14 so that the dam plate gravitationally drops into the bottom of the groove for blocking water flow through the rice box. To open the rice box the dam plate is simply lifted upwardly and removed from groove 28.

Adjacent their upper edge sidewalls 20 include opposing and aligned notches or depressions 30 which have a generally rectangular outline and which define a blind hole. An elongate stiffening or compression bar 32, such as a rectangular wooden member has a cross section complementary to that of notch 30 and a length equal to the spacing between notch bottoms 34. Consequently, when the compression bar is inserted in the notches the spacing between the sidewalls of the insert remains constant even though pressure is applied to them from the exterior of the rice box. To prevent an accidental dislodgement of the compression bar lips 36 are provided at the uppermost end of the notches which overlap the compression bar and which act as snap-in devices for securing the bars against accidental dislodging. By slightly prying the insert sidewalls apart the compression bar can be inserted or "snapped-in" place.

Groove 28 for dam plate 14 is adjacent to but horizontally spaced of the compression bar to assure an interference-free removal and insertion of the dam plate. Sidewall compressions or deflections from laterally acting forces applied by the levee in the vicinity of the groove are minimized or prevented. It is further preferred to locate compression bar 32 closer to one end of the insert than to the other to further minimize sidewall deflections between such end and the bar. The other, relatively long side of the insert is then provided with stiffening means such as a Z-shaped setback 38 in the sidewall to prevent excessive sidewall deflections at that side and to further provide the insert with sufficient rigidity during storage and transport so that shock, vibration or accidentally applied forces will not cause cracking or breakage of the walls.

Rice box 12 of the present invention is installed by forming a suitably shaped cutout in levee 6 and placing insert 14 in the cutout so that the upper surface of floor plate 18 coincides with ground level 10 while bottom flanges 22b extend below ground level. The space 40 between opposing faces 42 of side flanges 22a are now filled with ground and the ground is compacted to bring the levee in the vicinity of the gate back to its original height. This compacting of the ground and insertion of the bottom flanges into the ground generates frictional forces. For a gate of the above-mentioned dimensions, constructed of fiberglass and having flanges 22 of the stated widths, sufficient frictional forces are developed between the ground and the insert so that buoyancy forces, generated when one field section is filled with water are insufficient to raise or loosen the insert.

It will be observed that when dam plate 14 is removed to flow water from one field section to the other the highest water currents take place in the vicinity of vertical insert edges 44 on upstream end 24 of the insert. The high water currents, however, flow past outer face 46 of the flanges 22 so that the erosion of the levee in the immediate vicinity of the rice box, as heretofore frequently experienced, is prevented.

Referring now to FIGS. 6 and 7, at least initially water rushes through the rice box at relatively high speed. To prevent the on-rushing water from damaging the ground and/or crop thereon, a water deflector 48 is provided. The deflector preferably comprises a plate 50 which is upwardly inclined and extends away from the lower edge of bottom flange 22b on downstream end 26 of the insert. Normally an angle of inclination of plate 50 of between 22½° to about 60° is best. Plate 50 extends at least over a major portion of the width of the passageway through the insert and preferably over the full width of the gate as is illustrated in FIG. 8. Intermittently spaced gussets 52 are provided, tie plate 50 to the remainder of insert 16 and prevent undue deflections and/or breakage of the plate during storage, shipment or field use.

As is best seen in FIG. 6 the plate extends from a point below floor plate 80 upwardly to a point above the floor plate. For average rice field water depths the height of the free edge of the water deflector plate above the floor plate is at least about two inches and preferably between three to four inches. When so constructed the water flow is interrupted, dispersed and broken up so that soil erosion and crop damage from high water speeds is prevented.

We claim:

1. In a rice field including a plurality of field sections separated by levees for individually flooding the sections and including rice boxes for flowing water from one section to another section for the flooding of the sections with the same water, the improvement comprising at least one rice box between adjoining sections disposed in a generally U-shaped cutout of the levee, the rice box being defined by a generally U-shaped insert having a floor plate disposed at about the ground level of the sections and upwardly extending sidewalls, the floor plate and the sidewalls extending over the full width of the levee and including a vertically oriented groove communicating a top end of the sidewalls with the floor member, a flow regulating member removably disposed and positioned in the groove, a U-shaped flange disposed on each side of the floor plate and the walls extending perpendicularly away with respect to the adjoining floor plate and the walls, respectively, and having sides of the flanges facing each other in contact with the levee to generate frictional forces between the sides and the levee, the flanges having a width of at least about two inches so that the frictional forces developed between the flanges and the levee exceed a water buoyancy force acting on the insert to retain the insert firmly in place while sides of the flanges facing away from the insert prevent the erosion of portions of the levee adjacent the insert when the member is removed from the groove and water flows through the insert, opposing notches disposed adjacent upper ends of the sidewalls including generally horizontally oriented, opposing lips immediately below the upper ends, and an elongate stiffener having a length about equal to the spacing between bottoms of the notches and greater than a spacing between ends of the opposing lips, the ends of the stiffener being disposed in the opposing notches for maintaining the spacing between the upper ends of the sidewalls constant.

2. An installation according to claim 1 including a water deflector disposed on a downstream side of the rice box, the water deflector comprising an angularly inclined plate extending from adjacent the floor plate upwardly and outwardly therefrom to a point above the floor plate, the deflector plate having a width substantially equal to the width of the rice box.

3. In a field including a levee separating adjacent field sections, the levee including a flow regulating gate for flowing water from one section to another section for the flooding of the sections with the same water, the improvement comprising a gate defined by a generally U-shaped insert having a floor plate and upwardly extending sidewalls, the floor plate and the sidewalls extending over the full width of the levee, a flow regulating member removably disposed and positioned in the groove within the insert for selectively opening and closing the gate, flange means disposed on each end of the floor plate and the walls, the flange means having sides facing each other, the sides that the frictional forces developed between the flanges and the levee exceed a water buoyancy force acting on the insert to retain the insert firmly in place, opposing notches disposed adjacent upper ends of the sidewalls including generally horizontally oriented opposing lips immediately below the upper ends and an elongate stiffener having a length about equal to the spacing between bottoms of the notches and greater than a spacing between ends of the opposing lips, the ends of the stiffener being disposed in the opposing notches for maintaining the spacing between the upper ends of the sidewalls constant.

4. A water flow regulating gate for use in levees separating adjacent fields for flowing and blocking the flow of water flow from one field section to the other, the gate comprising a generally U-shaped member having a floor plate, upwardly extending sidewalls and flanges disposed on each end of the floor plate and walls for anchoring the member in a generally U-shaped cutout of the levee, the floor plate, the sidewalls and the flanges being integrally constructed of a relatively thin and flexible plastic material, an upright, flow regulating plate disposed between the floor plate and the sidewalls, means for retaining the flow regulating member between the floor plate and the sidewalls and permitting movement of the flow regulatng member between positions allowing and blocking a water flow through the gate, opposing lip means disposed adjacent upper ends of the sidewalls and protruding therefrom towards the other sidewall, elongate bar means having a length about equal to the spacing between the sidewalls adjacent the lip means and greater than the spacing between ends of the lip means, ends of the bar means being in contact with the sidewalls, and means for retaining the bar means adjacent the lip means to thereby maintain the spacing between upper ends of the sidewalls constant.

* * * * *